2,727,000

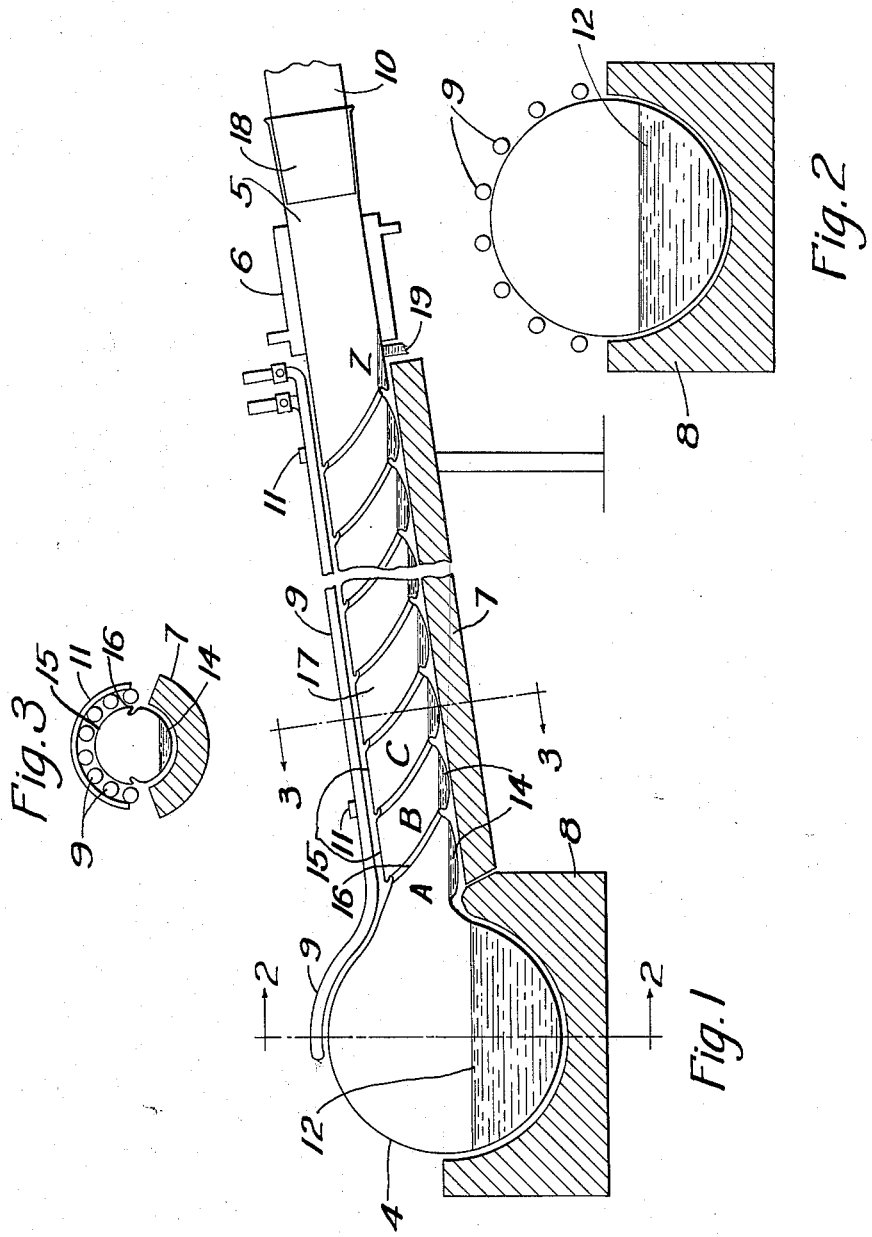
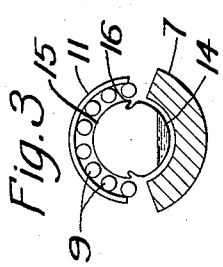
Inventor
Aubrey Keith Brewer
Samuel L. Madorsky
T. Ivan Taylor

CONCENTRATION OF URANIUM ISOTOPES BY MOLECULAR DISTILLATION OF URANIUM POLY ALKOXIDES

Aubrey Keith Brewer, Samuel L. Madorsky, and T. Ivan Taylor, Washington, D. C., assignors to the United States of America as represented by the United States Atomic Energy Commission Application March 19, 1945, Serial No. 583,495

5 Claims. (Cl. 202—52)

The present invention relates to the process of separating at least one isotope of an element from another isotope thereof. More particularly, the invention relates to the segregation or concentration of uranium of mass 235 in a fraction of the original material with the consequent segregation and concentration of uranium of mass 238 in another fraction of the original material. Broadly speaking, to accomplish such desired results, the present invention is directed to the process of molecularly distilling normally liquid uranium polyalkoxides having appreciable vapor pressures under pressure and temperature conditions wherein substantially no thermal decomposition of the uranium compounds takes place.

In the past, various substances have been subjected to molecular distillation. The art of segregating components of mixtures of liquids through means whereby molecules are removed from a thin liquid surface and condensed on a surface separated from the evaporation surface by a distance of approximately the mean free path of molecular travel is well known. These processes are referred to as molecular distillation. The apparatus and methods of employing the apparatus are well known and form no part of the invention in this application except insofar as they relate to the successful molecular distillation of the hereinafter referred to uranium polyalkoxides.

There are at least three known isotopes of uranium which occur together naturally in the following weight proportions, $U^{238}$ 99.28%; $U^{235}$ 0.714%; $U^{234}$ .006%. The amount of uranium of mass 234 naturally occurring in a mixture with the other two isotopes thereof is relatively small and its segregation does not form in particular an object of the present invention. However, it is noted that in the present process, substantial amounts of the $U^{234}$ are segregated with the $U^{235}$. Is an object of the present invention to subject a normally liquid polyalkoxide of a natural isotopic mixture of uranium thermally stable under the conditions of temperature and pressure employed to a molecular distillation procedure, to segregate or concentrate at least partly the uranium polyalkoxide whose uranium content is rich in mass 235 in a fraction and to likewise segregate a uranium polyalkoxide whose uranium content is rich in uranium of mass 238 in another fraction. To accomplish these objects, as well as others which will be apparent upon a further understanding of the invention hereinafter described, the following description is presented.

A number of uranium polyalkoxides together with their method of preparation have been disclosed in the co-pending application of Henry Gilman and Ernest Bindschadler, Serial No. 559,124, filed October 17, 1944. For the purposes of the present invention, the uranium compounds as disclosed in the Gilman et al. application are suitable for use in connection with the present invention if they are normally liquid in nature, have an appreciable vapor pressure at the selected temperature of molecular distillation and are substantially thermally stable under the condition employed. Compounds such as the foregoing are suitable if their rate of distillation is substantially greater than their rate of decomposition so that it is possible to molecularly distill and remove condensate from the still column considerably faster than appreciable decomposition of the liquid occurs.

Specifically, these compounds may comprise those selected from the group comprising uranium pentaethoxide, uranium penta normal propoxide, uranium hexaethoxide, uranium hexa normal propoxide. These specific compounds may not only be those in which all of the valences are satisfied by the same alkoxide radical, but the alkoxide radicals may be mixed, i. e., compounds such as uranium tetra normal propoxide, monoethoxide and the like are equally suitable for use in connection with the present invention provided that they satisfy the required physical characteristics heretofore set forth and do not undergo intermolecular rearrangements. Preferably, the pentaethoxide and the penta normal propoxide are employed chiefly because the hexa alkoxides, although being normally liquid, and having appreciable vapor pressures are, nevertheless, not quite as suitable since they are thermally more unstable. Furthermore, uranium pentaethoxide is preferred over uranium penta normal propoxide because the thermal stability of the former is greater than that of the latter when compared at temperatures where the vapor pressure of the two substances is substantially the same.

The conditions for carrying out the molecular distillation process using the above described uranium compounds for segregating and concentrating the compounds whose uranium content is of mass 238 in the still pot residue are relatively simple, but at the same time, are also critical if the operation is to be successfully accomplished. In the first place, the uranium polyalkoxides are subject to rapid decomposition and oxidation in the presence of water, oxygen, air and so forth. Generally, the penta normal propoxide is more resistant to oxidation than is the pentaethoxide. It is desirable to employ methods in handling these compounds to prevent hydrolysis or oxidation. The distance between the evaporation surface and the condensation surface is dependent to a large extent upon the mean free path of the molecule and in general the greater the distance between the two surfaces, the greater is the possibility and probability for collisions which interfere with the unidirectional flow of the molecules. Furthermore, the lower the temperature of the condensation surface, the greater is its accumulation accommodation coefficient for condensation with the result that fewer molecules will rebound after striking the condensation surface. The temperature, of course, should be low enough that the liquid upon being condensed will not undergo any substantial amount of "back" evaporation. Temperatures of the condensation surface, such as those obtained with liquid air, have the additional advantage that the vacuum is improved because of the immediate condensation of any decomposition products which might be present or occur during the distillation. Thorough agitation of the distilland at all times is desirable.

In general the distillation is carried out under a "sticking vacuum" as measured by a McLeod gage. The vacuum, however, may be between about $10^{-7}$ and about $10^{-3}$ mm. of mercury. In the runs carried out wherein a sticking vacuum was employed, the actual pressure was of the order of between about $10^{-3}$ and $10^{-5}$ mm. of mercury.

When employing such vacuums, the temperatures of uranium pentaethoxide as a distilland ranges between about 85 and 200° C. while for uranium penta normal propoxide, the temperature ranges between about 100 and 210° C.

The molecular still may be constructed of any material customarily employed in the manufacture of such stills with the exception that those surfaces which contact the uranium polyalkoxide employed should be relatively free of substances as zinc, aluminum, tin and the like, since it has been discovered that these materials accelerate the rate of decomposition of these materials. Stills, or liners for these stills may be desirably constructed of glass, Monel, stainless steel, nickel, Nichrome and the like customarily employed in corrosion-resistant, chemical reactors.

In successfully operating a molecular still employing the distilland herein referred to, the still pot or reservoir is charged with the distilland. A condensing surface in close proximity to and within the main free path of the molecules rising from the distilland surface is constructed. A portion of the still column may be heated if desired at those points where liquid condensate or liquid distilland forms a thin film on the bottom and sides thereof. The molecules rising from the thin film and which condense on the roof and sides of a suitably constructed column flow generally upwardly in that column and thereby give rise to a countercurrent or counterflow of liquid condensate with respect to unvaporized liquid flowing downwardly in the column. Such an apparatus is described in the copending application, Serial No. 478,844, filed March 11, 1943, now Patent No. 2,446,997, by Aubrey Keith Brewer and Samuel Leo Madorsky. Other types of stills designed for the molecular distillation of fish oils and vitamin preparations may also be employed, there being no intention to limit the present invention to any type of apparatus for carrying out the novel process.

One suitable form of a small scale molecular still for the segregation of isotopes which has been successfully employed in the process of the present invention is disclosed in the accompanying drawing. Figure 1 represents a diagrammatic partially sectional elevation of such a still. Figure 2 represents a section of the still pot of the apparatus disclosed in Figure 1 through the section line 2—2. Figure 3 represents a sectional view of the cups or sections of the reflux portion of the apparatus of Figure 1 through the section line 3—3.

The still proper shown in Figure 1 in one particular instance was made of glass and comprised a still pot or reservoir container 4 to which was attached in direct communication and at a suitable angle from the horizontal a reflux column 5 containing a plurality of individual cells of separate distillation units 17. The angle to the horizontal of the refluxing section of the column may vary considerably but in the apparatus disclosed in Figure 1, which was employed in carrying out the runs of Examples 1 and 2, was set at an angle of 10° to the horizontal. It will be understood of course that various angles may be employed depending upon the particular construction of the apparatus as for example angles bearing from 5 to 25° from the horizontal; also the reflux sections of cells 17 may vary in number depending upon the rapidity upon which the equilibrium is to be reached in operating the system. Generally the number of cells may vary between about 20 and about 250. More specifically, the apparatus employed in Examples 1 and 2 hereinafter detailed employed a column containing 25 sections or cells. The upper portion of the column is fitted with a condenser jacket 6 through which cooling fluids are passed in order to completely condense the vapors arising from the respective liquid pools in cups 14 particularly the last of such pools. Heater 8 is designed to vaporize the liquid 12 in the reservoir of the still pot 4. The entire system is maintained under the vacuum conditions heretofore specified. To accomplish this purpose a vacuum connection 10 is fitted into the still column by means of a ground vacuum type joint 18. Cooler pipes 9 positioned in place by clamps 11 are placed on the upper portion of the column 5 and the still pot 4 in order to cool the top and sides of the column and the upper portion of the reservoir adjacent the column. The cooling pipes 9 may be of copper or of other suitable material and they are provided with a manifold so that cooling water in each two adjacent tubes moves in opposite directions thus maintaining the cooled surfaces at a substantially uniform temperature. Suitable material may be packed around the heating and cooling elements in order to increase the efficiency of the system. "Smooth-on" cement or tin-foil may be employed for this purpose. In operating the system as already indicated oxygen and moisture are removed from the system while the liquid to be distilled for example, the uranium penta alkoxide, is charged to the apparatus through the vacuum connection 10 or through the outlet connection 19.

In one method of operating the system all of the cups and about half of the reservoir are filled with the charged liquid before operation is commenced. This insures a more rapid attainment of equilibrium conditions but if time is not of any great importance, all of the liquid may be charged to the still pot and the respective cups allowed to fill through the normal operation of the column. For a successful operation, although not necessarily the case, the liquid in the reservoir may be maintained at a slightly higher temperature than the liquid in the cups 14 or cells 17. The vapor rising from the liquid 12 in the still pot 4 is condensed by striking the cooled surface immediately below pipes 9 cooling the upper portion of the still pot 4. The condensed liquid then flows downwardly into cup 14 of cell A where the heat from heater 7 further vaporizes the liquid allowing it to strike the cooled surface 15 of cell B. The condensate of cell B flows downwardly and collects in a trough or channel 16 which guides it into the liquid reservoirs of cup 14 of cell B. In similar manner liquid from cup 14 of cell B reaches cup 14 of cell C, etc. In this manner the vapors and liquid condensed therefrom flow in a general direction upward through the column while the condensate upon filling cup 14 in each cell overflows into the next lower cell. The last cell Z has an outlet 19 from its reservoir or cup 14 and once the operation of the system has been maintained long enough the liquid condensate in cup 14 of cell Z becomes of substantially constant composition by reason of the equilibrium reached and maintained throughout the system. The equilibrium mixture may be either continuously or intermittently withdrawn from the system through pipe 19 provided a vacuum at least equal to that maintained in the still is also maintained in pipe 19. Alternatively and particularly in small scale operation no pipe 19 need be employed. In this case pipettes may be inserted through the vacuum connection 10 and the liquid condensate of cup 14 in cell Z or any selected cell may be thus withdrawn from the system. The reference characters in Figures 2 and 3 are the same characters assigned to the corresponding elements of Figure 1.

Having thus illustrated the general nature of the invention, the following examples are submitted with the idea of giving a fuller understanding thereof but with no intention however, of limiting the scope of the invention thereby.

*Example 1*

70 cc. (120 grams) of redistilled uranium pentaethoxide of normal isotopic uranium content is subjected to a molecular distillation in a still shown in Figure 1 of 25 cells at a temperature of about 120–125° C. for a period of about 116 hours. The temperature of the distilland layer within the still, because of constructional design, was about 10° C. lower than the temperature actually measured. A condensing surface was maintained at a temperature of about 25° C. with the aid of tap water. A sticking vacuum on the McLeod gage ($10^{-3}$ to $10^{-5}$ mm. of mercury) was likewise maintained. At the end of the 116 hours of operation, the liquid condensate collected in the upper portion of the column was converted to uranium hexafluoride and analyzed with the aid of a mass spectrometer to determine the content of uranium isotope of mass 235. It was found that there was an increase in the uranium isotope of mass 235 in the distillate of about 1.4% over the percentage of uranium isotope of mass 235 in the original distilland. The concentration of uranium of mass 235 in the residue in the still pot was determined and was found to be 0.15% less than the $U^{235}$ content of the original distilland.

The molecular still employed in this run has 25 physical plates or sections. This is equivalent to an average of about 3.5 physical plates per theoretical plate, based on a theoretical separation coefficient of 1.00325. This coefficient is arrived at by taking the square root of the mass of $U^{238}(OC_2H_5)_5$ over $U^{235}(OC_2H_5)_5$.

*Example II*

Another run was carried out in the same apparatus as that employed in Example I, employing 106 cc. (154 grams) of uranium penta normal propoxide of normal isotopic uranium content. The temperature on the heater was maintained at between about 147° and about 150° C. with the actual temperature of the distilland as in the case of Example I being about 10° C. lower. Here again, the condensing surfaces were maintained at a temperature of about 25° C. with the aid of tap water and the same sticking vacuum as employed in Example I was employed in the present instance. This run was maintained for a period of about 256 hours at the end of which time, the distillate was converted to $UF_6$ and subjected to an isotopic determination with the aid of a mass spectrometer. The increase in the uranium isotopes of mass 235 over that originally contained in the distilland amounted to about 1.4%.

*Example III*

An improved type of all-glass molecular still column of a high fractionating efficiency and having 150 physical plates or cells was employed in this run. 308 grams of uranium pentaethoxide was charged to the still pot. The distilland was maintained at a temperature of between about 140 and about 142° C. and the condensing surfaces were maintained at a temperature of about 40° C. After 30 days of continuous operation with the same charge of distilland, the distillate was recovered and converted into uranium hexafluoride salt. After mass spectrographic analysis, it was found that the final product contained about 6.75% enrichment of the uranium isotope of mass 235 as compared to the content of that same isotope in the original distilland.

It was also found that the residual uranium pentaethoxide in the still pot contained 0.51% less of the uranium isotope of mass 235.

Having thus now fully described and illustrated the character of the invention, what is desired to be secured by Letters Patent is:

1. A process of obtaining uranium having an increased content of the $U^{238}$ isotope and a decreased content of the $U^{235}$ isotope which comprises molecularly distilling a uranium alkoxy compound selected from the group consisting of uranium pentaethoxide and uranium penta normal propoxide, said uranium compound including the $U^{238}$ and $U^{235}$ isotopes, and then recovering the distillation residue in which a product having an enhanced $U^{238}$ content is concentrated.

2. A process of obtaining uranium having an increased content of the $U^{238}$ isotope which comprises molecularly distilling a uranium compound containing the isotopes $U^{235}$ and $U^{238}$ and selected from the group consisting of uranium pentaethoxide and uranium penta normal propoxide, and then recovering the distillation residue in which the uranium compound having an enhanced $U^{238}$ content is concentrated.

3. A process of obtaining uranium having an increased content of the $U^{238}$ isotope which comprises subjecting a uranium compound containing the isotopes $U^{235}$ and $U^{238}$ and selected from the group consisting of uranium pentaethoxide and uranium penta normal propoxide under a vacuum between about $10^{-7}$ and about $10^{-3}$ mm. of mercury to a molecular countercurrent distillation under a temperature below that at which substantial decomposition of the distilland occurs, and then recovering the distillation residue in which the uranium compound having an enhanced $U^{238}$ content is concentrated.

4. A process in accordance with claim 3 in which uranium pentaethoxide is subjected to molecular distillation at a temperature between about 85° C. and about 200° C.

5. A process in accordance with claim 3 in which uranium penta normal propoxide is subjected to molecular distillation at a temperature between about 100° C. and about 210° C.

References Cited in the file of this patent

UNITED STATES PATENTS

| 2,406,421 | Wollner et al. | Aug. 27, 1946 |
| 2,586,717 | Robinson | Feb. 19, 1952 |

OTHER REFERENCES

Deteiler: "Abstracts of Articles and Patents on Molecular or Short Path Distillation," published December 1941 by U. S. Dept. of Agriculture. Soybean Industrial Prods. Lab., Urbanna, Ill., pages 1 thru 5).

Champetier: Bull. de la Societe Chimique de France, 5 te serie, tome 3, (1936), pages 1706, 1707 and 1724.

Wollner et al.: Ind. and Eng. Chemistry, Analytical Ed., vol. 16, pages 529–531 (August 1944).